United States Patent [19]

Fuzzell et al.

[11] E Re. 30,928

[45] Reissued May 11, 1982

[54] ENGINE CONTROL

[75] Inventors: Joe E. Fuzzell, Peoria, Ill.; Paul E. Turnquist, Lubbock, Tex.

[73] Assignee: Caterpillar Tractor Co., Peoria, Ill.

[21] Appl. No.: 212,294

[22] Filed: Dec. 2, 1980

Related U.S. Patent Documents

Reissue of:

[64] Patent No.: 4,080,940
Issued: Mar. 28, 1978
Appl. No.: 809,344
Filed: Jun. 23, 1977

[51] Int. Cl.[3] ..... F02P 5/04

[52] U.S. Cl. ..... 123/333; 123/613; 123/414; 123/146.5 A; 123/331

[58] Field of Search ..... 123/331, 333, 335, 351, 123/352, 357, 358, 414, 613, 617, 631, 146.5 A, 198 D, 198 DB

[56] References Cited

U.S. PATENT DOCUMENTS

| | | | |
|---|---|---|---|
| 3,739,759 | 6/1973 | Sleder | 123/598 |
| 3,795,235 | 3/1974 | Donohue et al. | 123/603 |
| 3,867,916 | 2/1975 | Bigolke | 123/146.5 A |
| 3,893,108 | 7/1975 | McBride, Jr. et al. | 123/198 D |
| 3,898,962 | 8/1975 | Honig et al. | 123/488 |
| 3,901,201 | 8/1975 | Miziguchi et al. | 123/415 |
| 3,903,857 | 9/1975 | Hönig et al. | 123/416 |
| 3,916,865 | 11/1975 | Kiencke et al. | 123/333 |
| 3,946,709 | 3/1976 | Monpetit | 123/416 |
| 3,955,549 | 5/1976 | Burson | 123/601 |
| 3,982,512 | 9/1976 | Garcea et al. | 123/146.5 A |
| 4,008,701 | 2/1977 | Webber | 123/617 |
| 4,036,190 | 7/1977 | Bigliani et al. | 123/416 |
| 4,086,894 | 5/1978 | Capurka et al. | 123/613 |
| 4,138,976 | 2/1979 | Crall | 123/414 |

FOREIGN PATENT DOCUMENTS

| | | | |
|---|---|---|---|
| 766378 | 1/1957 | United Kingdom . | |
| 1073235 | 6/1967 | United Kingdom . | |
| 1107638 | 3/1968 | United Kingdom . | |
| 1116673 | 6/1968 | United Kingdom . | |
| 1128957 | 10/1968 | United Kingdom . | |
| 1133656 | 11/1968 | United Kingdom . | |
| 1139143 | 1/1969 | United Kingdom . | |
| 1238358 | 7/1971 | United Kingdom | 241/199.9 |
| 1246323 | 9/1971 | United Kingdom | 12/57 |
| 1248668 | 10/1971 | United Kingdom | 246/487 |
| 1257343 | 12/1971 | United Kingdom . | |
| 1351355 | 4/1974 | United Kingdom | 400/623 |
| 1400164 | 7/1975 | United Kingdom . | |
| 1450434 | 9/1976 | United Kingdom . | |

*Primary Examiner*—Raymond A. Nelli
*Attorney, Agent, or Firm*—Frank L. Hart

[57] ABSTRACT

An engine control wherein a shaft driven by the engine causes a first signal to be generated and then a second signal after the shaft has rotated through a predetermined degree. The first signal starts a timer into operation, the timer producing a timer pulse of predetermined duration. Time coincidence of the timer signal and second signal indicates that a critical engine speed has been reached and such time coincidence is used to effect a control function. If the shaft rotates in the opposite direction the sequence of generation of the first and second signals in such direction is detected and used to generate a reverse-direction signal which is used to effect a control function. An automatic impedance-changing circuit enables the control to be used with a wide range of batteries.

41 Claims, 5 Drawing Figures

ENGINE CONTROL

Matter enclosed in heavy brackets [ ] appears in the original patent but forms no part of this reissue specification; matter printed in italics indicates the additions made by reissue.

BACKGROUND OF THE INVENTION

This invention relates to engine controls and more particularly to sensor apparatus for sensing the speed and direction of engine rotation and to control circuits associated with the sensor apparatus for controlling the operation of the engine in the event of reverse rotation of the engine or when preselected engine speeds are attained.

It is desirable to provide automatic controls for engines which operate when a particular engine speed has been reached. For example, governors are widely used to limit the maximum speed of an engine or to shut down the engine in case the maximum speed is exceeded. Another example involves the starting motor which cranks the engine at low speed on startup. When the engine catches and picks up speed the starting motor should be disengaged or deactivated to prevent damage thereto. Oftentimes it is desirable to provide warning devices which signal an engine malfunction, such as low oil pressure, which malfunction may be different in magnitude depending on whether the engine is operating above or below a selected speed.

At times, a slight rocking of the engine shaft can occur with normal stops and starts, so that the engine rotates in a reverse direction. It is highly desirable that reverse rotation be detected and that the engine be shut down in the event of such rotation for otherwise severe damage to the engine could result if ignition occurred with the engine turning in the reverse direction.

Various mechanical devices have been provided in the past which are directly connected to a rotating portion of the engine for movement thereby, these devices providing a means whereby the engine speed and direction of rotation may be monitored. Such devices, however, are subject to wear and fouling by dirt and grime. In addition, complicated linkages are necessary to provide for adjustments in the event that the critical speed at which a control function is to occur is changed.

SUMMARY OF THE INVENTION

The present invention is directed to overcoming one or more of the problems set forth above.

According to the present invention, a magnet is mounted on an engine shaft and offset from the axis thereof so that the magnet orbits around the shaft at a speed proportional to the speed of the engine. At least one electronic switch is provided, the switch being fixed relative to the shaft and disposed adjacent the orbital path of the magnet and being actuable by the magnet when the magnet is proximate thereto.

Also according to the invention, a control circuit is provided which starts an electronic timer in response to a first signal from the actuation of the switch by passage of the magnet thereby, the timer having an output pulse of a preselected length. A second signal is generated when the magnet has been moved by the engine shaft through a fixed distance. If the engine speed is below the critical speed, the time required for the magnet to be moved through the fixed distance will be greater than the length of the timer pulse and the second signal will not be generated until after the timer pulse has ended. Conversely, if the engine speed is above the critical speed, the magnet will be moved more rapidly so that the second signal is generated before the timer pulse ends. A control signal is developed depending upon whether the second signal is generated before or after the end of the timer pulse, the control signal being then used to effect a desired control of an engine function.

Further according to the invention, the pulse length of the timer is easily adjustable so that the critical speed can be readily set to a desired value.

Also according to the invention, the control circuit may be used to shut down the engine in the event an overspeed situation occurs, and the operation of the circuit may be tested so that an overspeed situation is simulated when the engine reaches a predetermined proportion of the actual overspeed limit, the predetermined proportion being the same regardless of the particular overspeed limit selected for operation.

Still further according to the invention the direction of engine rotation is detected by use of a second magnetically actuated switch fixed adjacent the first switch, a logic circuit being provided to produce a control signal if the magnet passes by the two switches in one direction but not in the opposite direction.

Also according to the invention, an automatic impedance-changing circuit is provided to limit the input voltage to the control circuit to a safe value so that the control circuit may be used with any battery having an output voltage within a wide voltage range.

BRIEF DESCRIPTION OF THE DRAWINGS

In the drawings, forming a part of the application and in which like parts are designated by like reference numerals throughout the same.

FIG. 3 is a sectional view of the tachometer drive and sensor assembly, taken on line 3—3 of FIG. 2;

DESCRIPTION OF A PREFERRED EMBODIMENT

Figure 1:
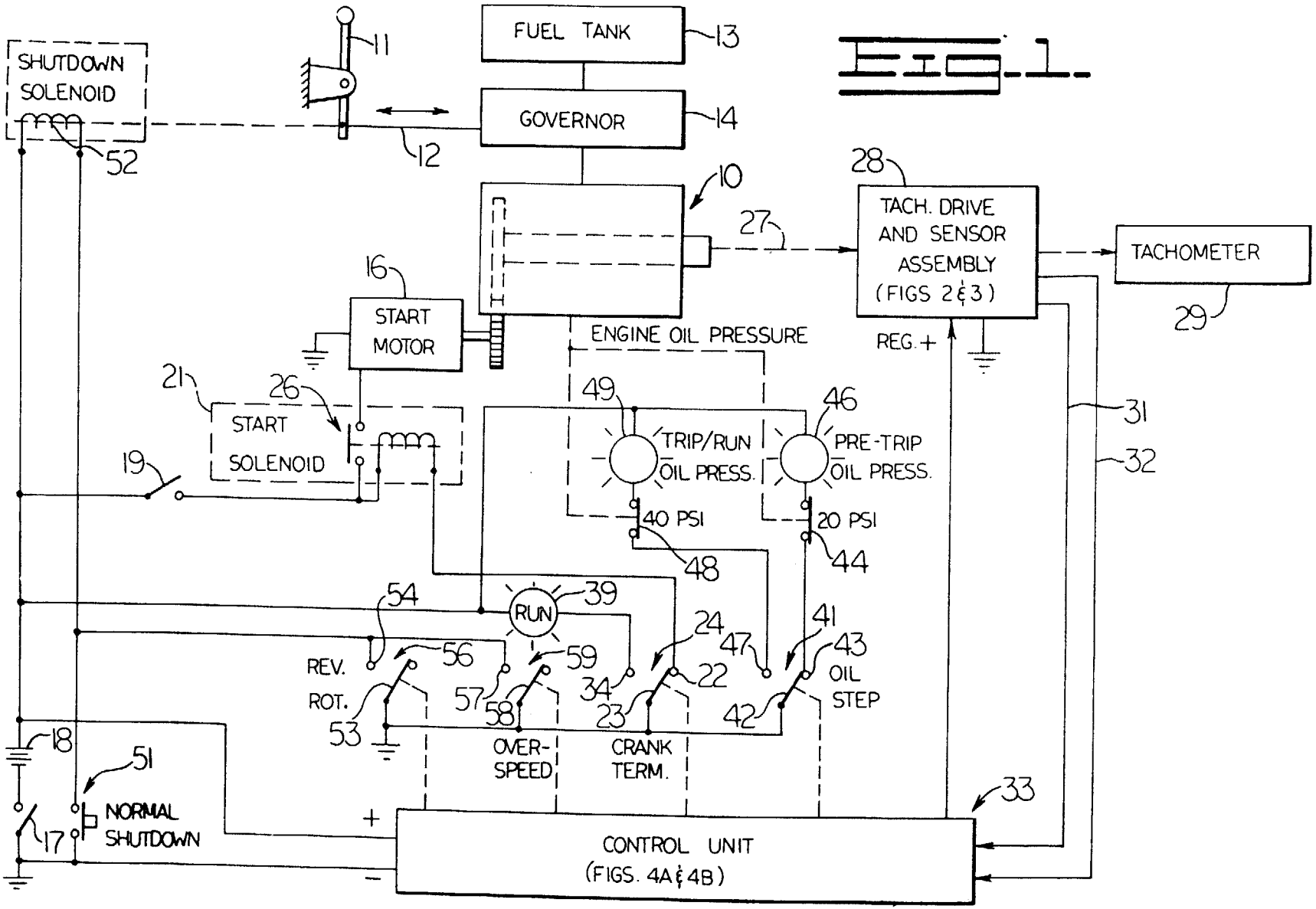
FIG. 1 is a combined block schematic diagram of an engine system utilizing the speed sensor and control unit of the present invention.
Figure 5:
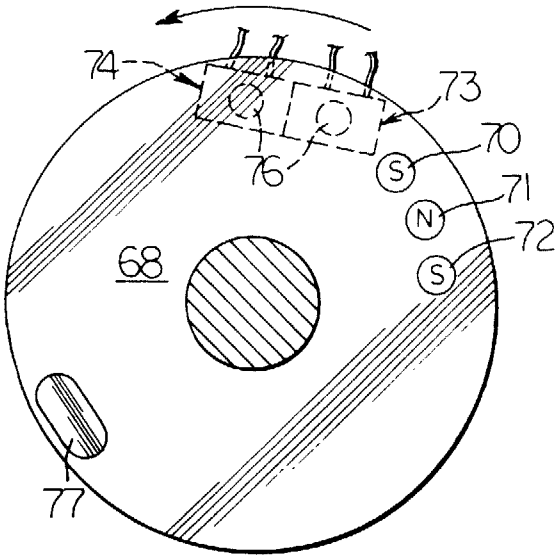

Referring now to the drawings, FIG. 1 illustrates a simplified but functional engine control system for engine 10 having a throttle lever 11 which reciprocates the fuel rack linkage 12 to control the amount of fuel flowing from fuel tank 13 through governor 14 to engine 10. The engine is provided with a conventional start motor 16 geared thereto. In starting, main switch 17 is closed to connect battery 18 to the operating circuits for the engine. Start switch 19 is closed to energize start solenoid 21 through the normally closed contact 22 and switch blade 23 of the crank termination switch 24. Energization of start solenoid 21 will cause its contacts 26 to close, supplying power from the battery to start motor 16 so that the engine is cranked. Shaft 27, directly driven by the engine, is coupled to the tachometer drive and sensor assembly 28 to drive the sensors therein at a speed proportional to the speed of the engine. Engine speed is displayed by a conventional tachometer 29. In addition, sensor information is transmitted by lines 31 and 32 to the control unit 33 to be used therein to determine the speed and direction of rotation of the engine. If the engine does start into operation on cranking thereof, control unit 33 causes the switch blade 23 of the crank termination switch 24 to move from the normally closed contact 22 to the normally open contact 34, to de-energize the start solenoid 21 and turn on the "RUN" light 39.

The control unit 33 is also used to provide a low-oil-pressure warning by the actuation of the oil step switch 41. At engine speeds below low idle, switch blade 42 will be closed against normally closed contact 43. If the oil pressure is below the normal level for operation at such speeds, e.g., 20 psi, switch 44 will be closed so that the pre-trip oil pressure warning light 46 will be energized from the battery 18. If the engine speed is above low idle, control unit 33 causes switch blade 42 to close against normally open contact 47. The existence of normal oil pressure will maintain oil-pressure switch 48 open. If the oil pressure drops below normal, e.g. below 40 psi, switch 48 closes and turns on the trip/run oil-pressure warning light 49.

The engine 10 may be shut down in any conventional manner. For example, closing the manually operable normal-shutdown switch 51 will complete an energizing circuit from the battery 18 to the shutdown solenoid 52 and cause the fuel-rack linkage 12 to move to a fuel-off position. In addition, control unit 33 provides for automatic shutdown in the event that the engine is rotating in the reverse direction or if the engine speed exceeds a predetermined maximum speed. If the engine is rotating in the wrong direction, switch blade 53 will be closed against normally open contact 54 of the reverse rotation switch 56 to ground and energize the shutdown solenoid. Similarly, the shutdown solenoid will be energized through normally open contact 57 and switch blade 58 of overspeed switch 59 if the engine speed is excessive.

Figure 2:
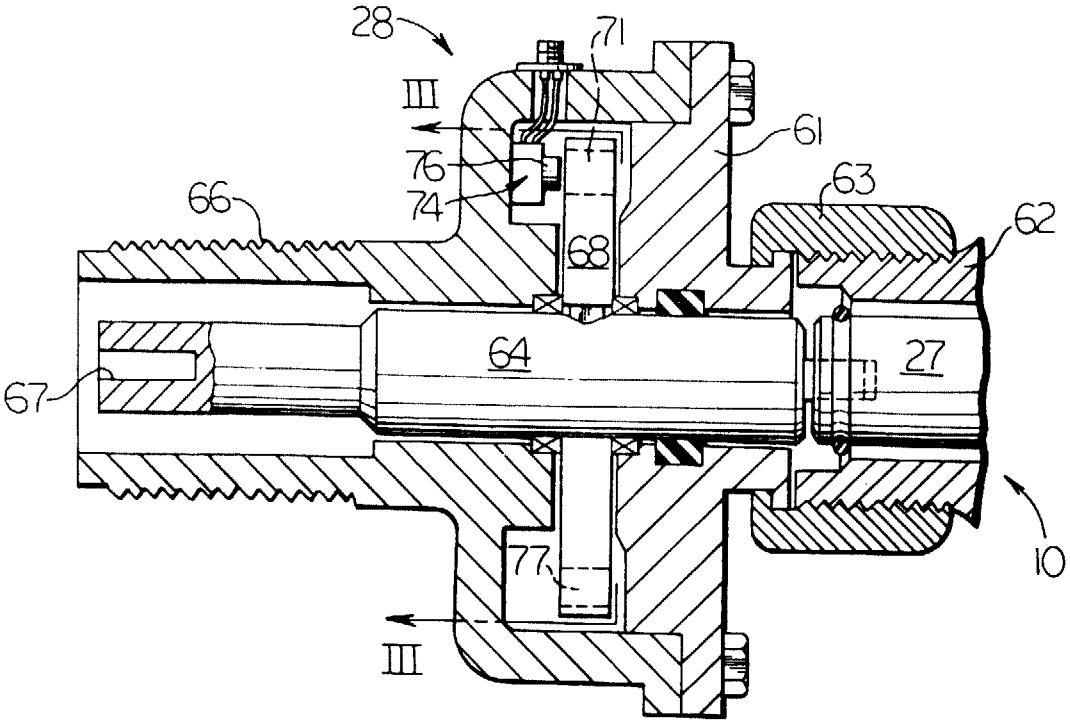
FIG. 2 is a sectional view of the tachometer drive and sensor assembly of FIG. 1.

The tachometer drive and sensor assembly 28 is illustrated in FIGS. 2 and 3, and comprises a housing 61 secured to frame 62 of engine 10 by collar 63. Shaft 64 is journaled in housing 61 and is coupled to shaft 27 of the engine for unitary rotation therewith. Shaft 27 is preferably the drive shaft of the fuel pump for the engine which rotates at one-half engine speed. However, shaft 27 may be any operating member of the engine, it being important only that shaft 64 by driven by the engine at a speed proportional to the speed of the engine. Housing 61 is provided with external threads 66 and the end of shaft 64 is slotted at 67 for the usual connection of a drive cable for the engine tachometer 29.

A radially extending disc 68 is fixed to shaft 64 for rotation therewith and has three bar magnets 70, 71 and 72 potted or pressed within bores in the disc, the magnets being the same distance outwardly from the axis of shaft 64. Two closely spaced Hall effect switches 73 and 74 are fixed to housing 61, with their sensors 76 positioned closely to disc 68 to be affected by the magnets as they are rotated therepast. A counterweight 77 is mounted in disc 68 opposite the magnets for balancing purposes.

Figure 4A:
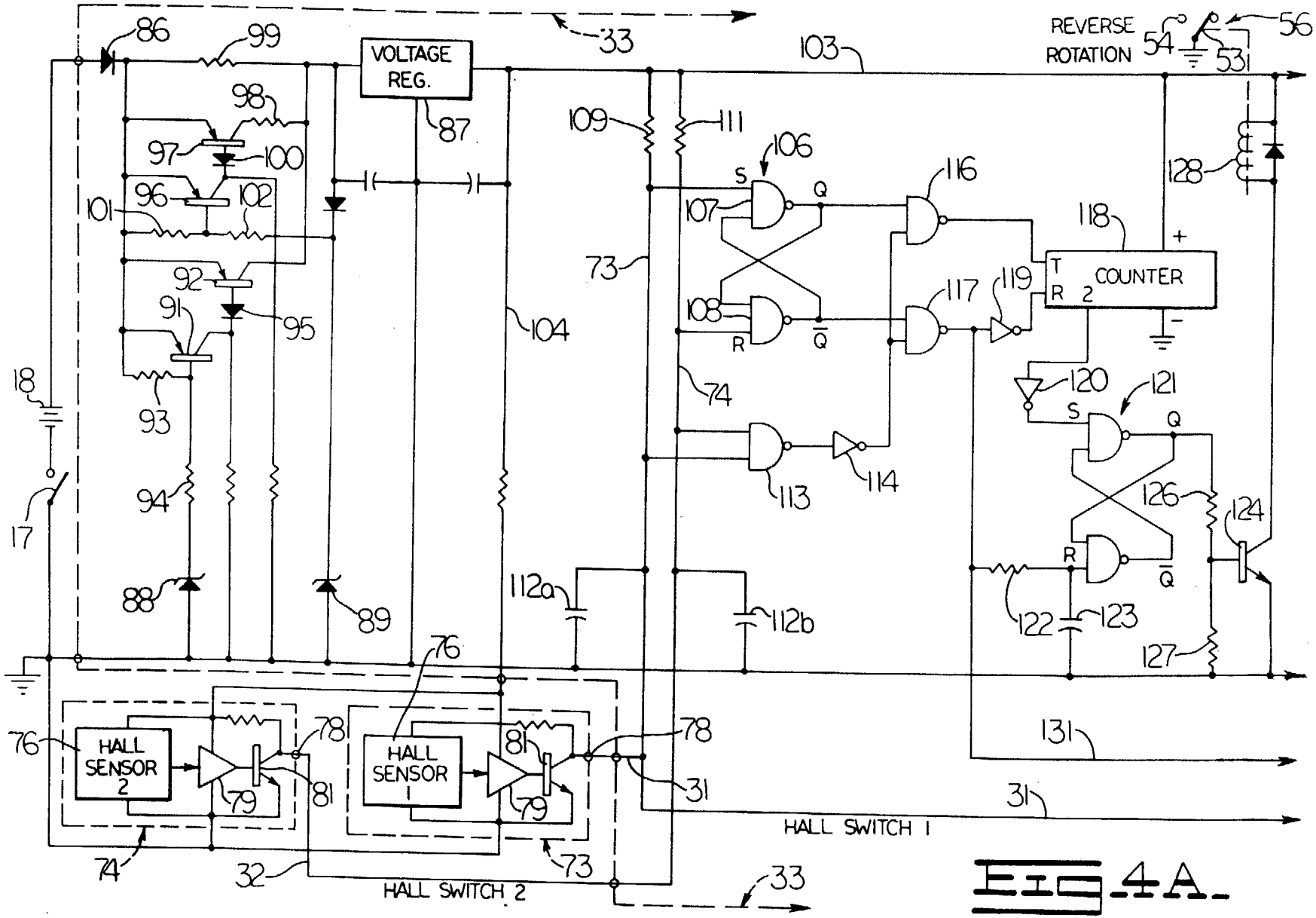
FIGS. 4A and 4B are circuit diagrams of the control unit of FIG. 1.

Hall effect switches 73 and 74 are schematically illustrated in FIG. 4A. When not actuated, the output terminals 78 of the switches are at a high voltage level, namely that of the power supplied to the switch. When the sensor 76 of a switch is influenced by a magnetic south pole, the sensor output is amplified by amplifier 79 and turns on transistor 81 to "close" the switch and ground the output terminal 78.

Returning to FIG. 3, three bar magnets 70, 71 and 72 are used, to sharply define the magnetic field and enhance reliability of the switch points of the Hall switches by causing the Hall sensors to be influenced by a north pole preceding and following a south pole. When disc 68 is driven in the direction of the arrow by forward rotation of the engine, the north pole of magnet 70 will move past the Hall sensors and the south pole of magnet 71 will then move past the sensors to cause their outputs to go low during the passage of magnet 71 therepast.

The sensors of the Hall switches 73 and 74 are spaced closely together and the magnet 71 is dimensioned relative thereto to provide a make-before-break operation. I.e., as magnet 71 is moved by the sensors in the direction as shown, Hall switch 73 will first close. Hall switch 74 will then close, followed by an opening of Hall switch 73 as it is influenced by the north pole of magnet 72. Hall switch 74 will thereafter open in similar fashion. Both switches will remain open, with a high output, until the next time that magnet 71 moves therepast. The Hall switches will be similarly operated in a make-before-break manner if the magnet 71 is moved therepast in the opposite direction, with Hall switch 74 being closed before Hall switch 73.

Figure 4B:
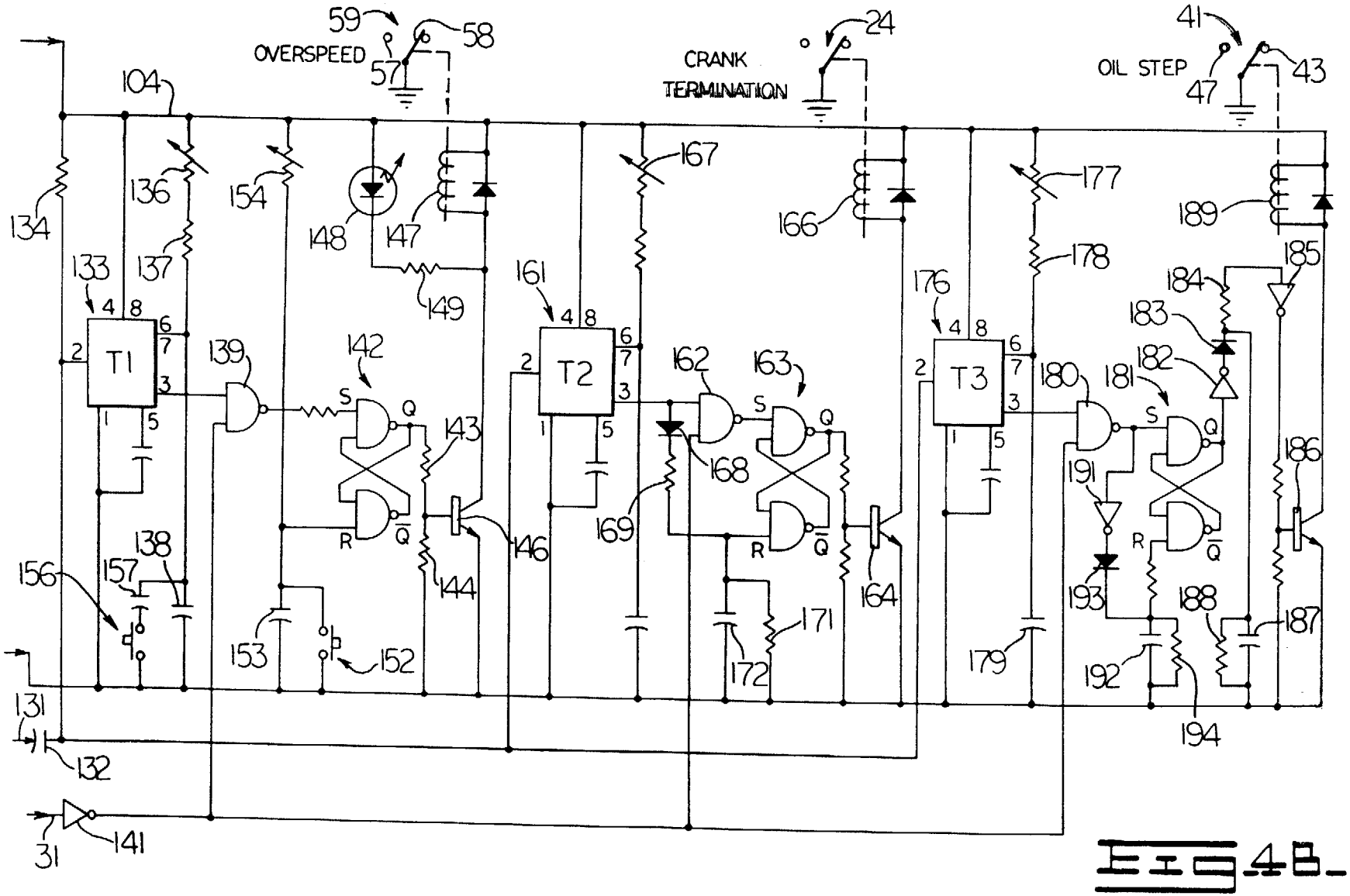

The operating circuits of control unit 33 are shown in detail in FIGS. 4A and 4B.

The power input from battery 18 is applied through diode 86 to an automatic impedance-changing arrangement which limits the input voltage to the voltage regulator 87 to a safe value so that the control unit may be used with a wide range of batteries.

For example, in the particular embodiment disclosed, a 6-volt voltage regulator is used, the control circuits draw a maximum of 150 milliamps, it is desired to limit power dissipation by the regulator to approximately 2 watts, and it is desired to provide for operation with a battery having an output anywhere in the range of from 8 to 40 volts.

Zener diodes 88 and 89 are provided, these diodes having breakdown potentials of 20 and 30 volts respectively. If the battery voltage is below 20 volts, diode 88 will not conduct and transistor 91 will be off, allowing transistor 92 to turn on and provide a direct path for current flow from the battery to voltage regulator 87. In such case, the maximum voltage across regulator 87 will be the difference between its maximum 20-volt input and its 6-volt regulated output voltage, or 14 volts. With maximum current of 150 milliamps, the maximum power dissipation in the regulator will be 2.1 watts.

If the battery voltage is above 20 volts, zener diode 88 will conduct through resistors 93 and 94, and the drop across resistor 92 will turn transistor 91 on, thereby reverse biasing diode 95 in the base circuit of transistor 92 and turning the latter off. If the battery potential is less than 30 volts, zener diode 89 will not conduct, and transistor 96 will be off, allowing transistor 97 to conduct. Such conduction will place resistors 98 and 99 in parallel between the battery and voltage regulator 87. If resistors 98 and 99 have values of 180 and 150 ohms, respectively, the parallel value of these resistors will be approximately 82 ohms. At maximum current, the maximum voltage across the voltage regulator would be $[30-(82\times0.150)-6]$, or 11.7 volts, and the maximum power dissipation in the regulator would be 1.755 watts.

(At operation below 20 volts, transistor 97 will be conductive, but no appreciable current will flow through resistors 98 or 99 since they are shunted by transistor 92.)

With a supply voltage greater than 30 volts, zener diode 89 will conduct through resistors 101 and 102, causing transistor 96 to conduct, reverse biasing diode 100 which turns off transistor 97, leaving only resistor 99 in the circuit for full current flow therethrough to the voltage regulator. Maximum power dissipation in the voltage regulator 87, at a 40-volt supply and a 150-milliamp maximum current would be 1.725 watts.

The 6-volt regulated output from voltage regulator 87 is applied to the positive bus 103, and is also used, by line 104, to power the Hall switches.

The reverse rotation circuit will now be described. A flip-flop 106 is provided, comprising NAND gates 107 and 108 interconnected as shown. With this arrangement a low reset signal to the $\underline{R}$ input of gate 108 of the flip-flop will cause the Q and $\overline{Q}$ outputs to go low and high, respectively. If a low set signal is then applied to the $\underline{S}$ input of gate 107 when the R input is high, the Q and $\overline{Q}$ outputs will go high and low respectively and will stay that way, even though the set signal then goes high, until a low reset signal is subsequently applied to the R input.

The S input of flip-flop 106 is connected through resistor 109 to the positive bus 103 and is also connected to the output terminal 78 of Hall switch 73 by line 31. Thus, the S input will be maintained high except when a low set signal is applied thereto when Hall switch 73 is closed.

The reset input R of flip-flop 106 is similarly connected through resistor 111 to the positive bus 103 and to the output terminal 78 of Hall switch 74. The reset input will thus be held high except when Hall switch 74 closes to ground the reset input. Capacitors 112a and 112b connect the inputs of flip-flop 106 to ground so that transients will not cause false triggering of the flip-flop when the power is first turned on.

The two inputs of NAND gate 113 are connected to the two Hall switch outputs. If both Hall switches are open, both inputs are high and gate 113 will output a low, which is inverted to a high by inverter 114 and applied to NAND gates 116 and 117. If either, or both, Hall switches are closed, NAND gate 113 will output a high so that inverter 114 will apply a low, inhibiting voltage to gates 116 and 117.

The Q output of flip-flop 106 is also applied to gate 116, whose output is applied to the trigger input T of counter 118. The $\overline{Q}$ output of flip-flop 106 is applied to gate 117 whose output is inverted by inverter 119 and applied to the reset input R of counter 118. Counter 118 is reset by a high signal to R and triggered by a low signal to T. The second output 2 of counter 118 is normally low but will go high when the counter has been twice triggered. This output, inverted by inverter 120 is applied to the set input S of flip-flop 121. The reset input R of flip-flop 121 is connected by resistor 122 to the output of gate 117 and is connected to ground by capacitor 123.

If the Q output of flip-flop 121 is low, transistor 124 is turned off. With a high Q output, current flow through resistors 126 and 127 will turn transistor 124 on and energize relay coil 128 therethrough and cause the reverse rotation switch 56 to be actuated.

In flip-flop configurations employing NAND circuits as is the case for flip-flop 106, the reset function has priority. Therefore when power is initially applied, capacitor 112b will cause flip-flop 106 to reset with a low Q output and a high $\overline{Q}$ output. When capacitor 112b charges, it will hold the R input of flip-flop 106 high until such time as Hall switch 74 closes. The high $\overline{Q}$ output and high output from inverter 114 causes gate 117 to output a low to reset counter 118. During initial power, capacitor 123 appliee a low reset signal to flip-flop 121, and the low from gate 117 holds the low reset to flip-flop 121 to maintain a low Q output from flip-flop 121 and a turn-off signal to transistor 124.

The state of the various components of the reverse-rotation circuit during normal forward rotation is set forth in the following table wherein high and low voltage levels are indicated by 1's and 0's, respectively. Step 1 sets forth the condition during the time before magnet 71 comes to the Hall sensors. Steps 2–4 set forth what happens as the Hall sensors are influenced by magnet 71 and Hall switches 73 and 74 are operated in that order and in a make-before-break manner. Step 5 represents the time period after the magnet leaves the Hall sensors and before it comes to them again. Steps 6–8 are for the next pass-by of the sensors by the magnet, and step 9 is again when the magnet has left the sensors and they restore to normal. Each succeeding full revolution of disc 68 will repeat steps 6–9.

FORWARD ROTATION

| | F/F 106 | | | | | | | Counter 118 F/F 121 | | | | | | |
|---|---|---|---|---|---|---|---|---|---|---|---|---|---|---|
| Step | S (Hall 73) | R (Hall 74) | Q | $\overline{Q}$ | 113 out | 114 out | 117 out | R (119 out) | T (116 out) | 2 | S | R | Q | 124 |
| 1 | 1 | 1 | 0 | 1 | 0 | 1 | 0 | 1 | 1 | 0 | 1 | 0 | 0 | off |
| 2 | 0 | 1 | 1 | 0 | 1 | 0 | 1 | 0 | 1 | 0 | 1 | 1 | 0 | off |
| 3 | 0 | 0 | 1 | 0 | 1 | 0 | 1 | 0 | 1 | 0 | 1 | 1 | 0 | off |
| 4 | 1 | 0 | 0 | 1 | 1 | 0 | 1 | 0 | 1 | 0 | 1 | 1 | 0 | off |
| 5 | 1 | 1 | 0 | 1 | 0 | 1 | 0 | 1 | 1 | 0 | 1 | 0 | 0 | off |
| 6 | 0 | 1 | 1 | 0 | 1 | 0 | 1 | 0 | 1 | 0 | 1 | 1 | 0 | off |
| 7 | 0 | 0 | 1 | 0 | 1 | 0 | 1 | 0 | 1 | 0 | 1 | 1 | 0 | off |
| 8 | 1 | 0 | 0 | 1 | 1 | 0 | 1 | 0 | 1 | 0 | 1 | 1 | 0 | off |
| 9 | 1 | 1 | 0 | 1 | 0 | 1 | 0 | 1 | 1 | 0 | 1 | 0 | 0 | off |

As will be seen, each time that Hall switch 73 closes (step 2), flip-flop 106 will be set so that its Q output goes high. Hall switch 74 closes shortly thereafter (step 3) and as soon as Hall switch 73 opens, flip-flop 106 will reset. The high Q output from the setting of flip-flop 106 cannot trigger counter 118 since it occurs only during the time period when the magnet is passing the Hall sensors, and gate 116 is inhibited by gate 113 during such period. As a consequence, counter 118 is never triggered during forward rotation and flip-flop 121 will maintain transistor 124 off.

The sequence of operations in the event of a reverse rotation of the engine is set forth in the next table. Step 1 is the situation before magnet 71 comes to the Hall sensors. Steps 2–4 represent the conditions as the magnet passes by the sensors, with Hall switch 74 now being closed before Hall switch 73. Step 5 is the next period as the magnet travels with disc 68 around to the sensors again. Steps 6–8 are the next actuation of the Hall switch, and step 9 is when the Hall sensors are passed. Steps 10–13 represent another full revolution of disc 68. Steps 14–16 illustrate the resetting which occurs as the engine is cranked forwardly in a re-start operation.

REVERSE ROTATION AND RESET

| | F/F 106 | | | | | | | Counter 118 F/F 121 | | | | | | |
|---|---|---|---|---|---|---|---|---|---|---|---|---|---|---|
| Step | S Hall 73 | R Hall 74 | Q | $\overline{Q}$ | 113 out | 114 out | 117 out | R 119 out | T 116 out | 2 | S | R | Q | 124 |
| 1 | 1 | 1 | 0 | 1 | 0 | 1 | 0 | 1 | 1 | 0 | 1 | 0 | 0 | off |
| 2 | 1 | 0 | 0 | 1 | 1 | 0 | 1 | 0 | 1 | 0 | 1 | 1 | 0 | off |
| 3 | 0 | 0 | 0 | 1 | 1 | 0 | 1 | 0 | 1 | 0 | 1 | 1 | 0 | off |
| 4 | 0 | 1 | 1 | 0 | 1 | 0 | 1 | 0 | 1 | 0 | 1 | 1 | 0 | off |
| 5 | 1 | 1 | 1 | 0 | 0 | 1 | 1 | 0 | 0 | 0 | 1 | 1 | 0 | off |
| 6 | 1 | 0 | 0 | 1 | 1 | 0 | 1 | 0 | 1 | 0 | 1 | 1 | 0 | off |
| 7 | 0 | 0 | 0 | 1 | 1 | 0 | 1 | 0 | 1 | 0 | 1 | 1 | 0 | off |
| 8 | 0 | 1 | 1 | 0 | 1 | 0 | 1 | 0 | 1 | 0 | 1 | 1 | 0 | off |
| 9 | 1 | 1 | 1 | 0 | 0 | 1 | 1 | 0 | 0 | 1 | 0 | 1 | 1 | on |
| 10 | 1 | 0 | 0 | 1 | 1 | 0 | 1 | 0 | 1 | 1 | 0 | 1 | 1 | on |
| 11 | 0 | 0 | 0 | 1 | 1 | 0 | 1 | 0 | 1 | 1 | 0 | 1 | 1 | on |
| 12 | 0 | 1 | 1 | 0 | 1 | 0 | 1 | 0 | 1 | 1 | 0 | 1 | 1 | on |
| 13 | 1 | 1 | 1 | 0 | 0 | 1 | 1 | 0 | 0 | 1 | 0 | 1 | 1 | on |
| 14 | 0 | 1 | 1 | 0 | 1 | 0 | 1 | 0 | 1 | 0 | 1 | 1 | 1 | on |
| 15 | 0 | 0 | 1 | 0 | 1 | 0 | 1 | 0 | 1 | 0 | 1 | 1 | 1 | on |
| 16 | 1 | 0 | 0 | 1 | 1 | 0 | 1 | 0 | 1 | 0 | 1 | 1 | 1 | on |
| 17 | 1 | 1 | 0 | 1 | 0 | 1 | 0 | 1 | 1 | 0 | 1 | 0 | 0 | off |

In the first pass-by of the Hall sensors by magnet 71 (steps 2–4) Hall switch 74 closes before Hall switch 73. As a result of this, flip-flop 106 will now be set in step 4, and its Q output will remain high during the time that magnet 71 is carried around and back to switch 74 (step 5). During step 5, the high outputs of both Hall switches cause gate 113 to output a low which is inverted and applied to gate 116, so that with a high Q output, gate 116 can deliver a low trigger to counter 118. When the magnet again comes to the Hall sensors (steps 6–8) flip-flop 106 is reset (step 6) and then set again (step 8) so that in step 9 another low trigger pulse is applied to counter 118. With two counts therein, counter output 2 goes high so that inverter 120 applies a low set signal to the S input of flip-flop 121. The Q output goes high to turn on transistor 124 so that relay 128 actuates the reverse rotation switch 56 to ground the shutdown solenoid (FIG. 1) and shut off fuel to the engine.

Since the $\overline{Q}$ output of flip-flop 106 is low in reverse rotation during the period between actuation of the switches, gate 117 will output a high at all times, and flip-flop 121 will not be reset. Thus, once flip-flop 121 is set, transistor 124 will remain on even though the set signal from counter 118 may disappear.

With the fuel cut-off in response to actuation of switch 56, the engine will stop, and the state of the components will be as shown in step 13.

The start motor may now be energized to crank the engine forwardly as in a normal start operation. As disc 68 moves the magnet 71 past the Hall sensors (steps 14–16), flip-flop 106 will be reset in step 16 so that its $\overline{Q}$ output will go high. As soon as the magnet leaves the sensors (step 17) gate 113 will output a low to remove the inhibit voltage from gate 117. Its output will go low so that a reset signal is delivered through inverter 119 to counter 118 and through resistor 122 to flip-flop 121. With the latter reset, transistor 124 is turned off so that the reverse-rotation switch 56 restores to its normal illustrated position. Fuel can now flow to the engine and the engine will start on further cranking.

The above circuit, by use of counter 118, allows a single reverse pass of the Hall sensors by magnet 71 to occur, as can happen through slight rocking of the engine shaft on normal stops and starts, without shutdown, while ensuring shutdown if two consecutive reverse passes of the sensors occur.

The output of gate 117 is sent by lead 131 to the overspeed, crank termination and oil step circuits of FIG. 4B. As brought out above, the output of gate 117 will go low only during forward rotation of the engine, each time that magnet 71 leaves the second Hall switch 74, and will remain low until the magnet is carried back to the first Hall switch 73.

In FIG. 4B, the output of gate 117 on lead 131 is applied through capacitor 132 to terminal 2 of timer 133, this terminal also being connected, by resistor 134, to the positive bus 104. Timer 133 has a normally low output at its terminal 3 and operates such that when the voltage at terminal 2 falls below one-third of the voltage on bus 104 the timer is triggered and produces a single pulse (terminal 3 goes high) whose duration is determined by the values of resistors 136 and 137 and capacitor 138. Resistor 136 is adjustable so that the length of the pulse may be set as desired. If desired, a commercially available Signetics SE 555 CV Monolithic linear integrated timer circuit may be used, such timer having terminals as shown in FIG. 4B.

When the engine rotates in the forward direction, timer 133 will be triggered each time magnet 71 leaves the second Hall switch 74 to produce a single pulse which is applied to one of the inputs of NAND gate 139. The output of the first Hall switch 73 is inverted by inverter 141, so that whenever Hall switch 73 is actuated by magnet 71, a high will be applied to gate 139.

During engine operation at any forward speed below the predetermined overspeed limit, timer 133 will generate a high pulse at its output pin 3 as soon as magnet 71 leaves Hall switch 74. This pulse will time out during the time that the rotation of shaft 64 is carrying the magnet back to Hall switch 73, so that the timer output will go low again before magnet 71 reaches Hall switch 73. During this pulse period, Hall switch 73 is outputting a high so that inverter 141 applies a low to gate 139. When the magnet again reaches Hall switch 73, it will output a low and inverter 141 will output a high to gate 139, but timer 133 will be outputting a low to gate 139 at such time. As a consequence, gate 139 will have at least one low input at all times so that its output is continuously high and flip-flop 142 is never set.

As the engine speed increases, the time required for shaft 64 to rotate magnet 71 from Hall switch 74 back to Hall switch 73 will decrease. If the engine speed increases to above the overspeed limit, the speed of shaft 64 will increase to such an extent that the timer for the magnet to travel from Hall switch 74 to Hall switch 73 is less than the fixed length pulse time of timer 133. As a consequence, inverter 141 will output a high to gate 139 while timer 133 is still outputting a high thereto. This time coincidence of high inputs to gate 139 causes its output to go low and set flip-flop 142. Its Q output goes high and the voltage divider, made up of resistors 143 and 144, will turn transistor 146 on to ground relay coil 147 so that the energization thereof from positive bus 104 will cause the switch blade 58 of the overspeed switch 59 to close against the normally open contact 57 to ground the shutdown solenoid 52 and shut off fuel to the engine. With transistor 146 on, light-emitting diode 148 will be energized through resistor 149 and transistor 146 to provide a visual signal of the overspeed condition.

Once set, flip-flop 142 will continue to have a high Q output until such time as a low reset signal is applied. In the present embodiment, flip-flop 142 is reset by a closure of manually operable switch 152 which grounds the reset input R of flip-flop 142 and resets the flip-flop so that its Q output goes low and turns transistor 146 off. Opening of reset switch 152 allows capacitor 153 to charge through resistor 154 and thereafter maintain a high on the reset input.

Preferably resistor 136 is adjusted so that the overspeed trip point is somewhat above the nominal maximum speed of the engine to allow for normal, short-term increases in engine speed without causing unwanted shutdowns.

It is desirable that the operator be able to test the functioning of the overspeed circuit to see if all is in order while the engine is operating at a normal speed, i.e., near rated speed but below the overspeed limit set by the adjustment of resistor 136. Testing is accomplished by means of the manually operable test switch 156 which, when closed, will connect capacitor 157 in parallel with capacitor 138. This will increase the amount of capacitance in series with resistors 136 and 137 and will lengthen the time required for the voltage at pins 6 and 7 of timer 133 to rise to a level which will cause the timer pulse to terminate. The longer timer pulse thus establishes a lower test speed limit. Thus, if the engine is rotating at a normal speed, and such speed is above the test speed, the overspeed circuit will function to cause the overspeed relay 59 to operate.

The length of the timer pulse is a direct function of the RC values of resistors 136 and 137 and capacitors 138 and 157. The overspeed limit varies inversely with these values. Thus, the normal overspeed limit will be a function of 1/(resistor 136+resistor 137)(capacitor 138), and the test speed limit will be a function of 1/(resistor 136+resistor 137)(capacitor 138+capacitor 157). If it is desired to have the test speed be 75% of the normal overspeed limit, then 1/(R136+R137)(C138+C157)=(0.75/R136+R137)(-C138). From this, it will be found that capacitor 157 should be equal to one-third the value of capacitor 138 in order to have the test speed limit be 75% of the normal overspeed limit. Moreover, it will be found from this equation that if the resistance is maintained the same for both the normal overspeed limit and during testing, and if capacitors 138 and 157 have fixed values, the ratio of test speed to overspeed will be the same regardless of the value to which resistor 136 has been adjusted.

Thus, by means of the present test circuit, wherein fixed capacitor 157 may be placed in parallel with fixed capacitor 138, the normal overspeed limit can be adjusted to any speed permitted by the range of adjustment of resistor 136, and the test speed limit will be a constant percentage of whatever the selected overspeed limit may be, e.g., 75% of the overspeed limit in the above example.

The Crank Termination circuit operates very much in the same way as the overspeed circuit. The same signal that causes the overspeed timer 133 to pulse is also applied to pin 2 to the crank termination timer 161, and the output pulse therefrom is applied to NAND gate 162. Similarly, the output from inverter 141 is applied to gate 162. Thus, if Hall switch 73 is actuated before the end of the pulse from timer 161, the output of gate 162 will go low to set flip-flop 163 and turn on transistor 164 so that relay coil 166 is energized, thereby causing the crank termination switch 24 to operate.

The length of the pulse from timer 161 is set, by adjusting resistor 167, somewhat above normal crank speed and below low idle speed of the engine, so that when the engine catches it will actuate the crank termination circuit.

During cranking, each time the output of timer 161 goes high, the timer pulse is transmitted through diode 168 and resistor 169 to the reset input of flip-flop 163 and to the resistor 171 and capacitor 172 network. These pulses serve to establish a charge on capacitor 172 and thus prevent resetting of the flip-flop.

Once set, flip-flop 163 will remain latched by the charge on capacitor 172 until engine rotation is stopped, either by normal shutdown or by coasting down from the crank termination speed if the engine does not start. When the output pulses from timer 161 stop, capacitor 172 can discharge through resistor 171 and a low signal will then be applied to the reset input R of flip-flop 163 to provide an automatic reset. The output of the flip-flop goes low to turn off transistor 164 and de-energize the crank termination relay coil 166.

Preferably, the time delay for resetting, established by the RC network of resistor 171 and capacitor 172, is greater then the time required for the engine to decelerate to a stop.

The Oil Step circuit is designed to provide two different warnings to the engine operator. A first warning is given when the engine speed is below a selected speed that is less than normal operating speed and the oil pressure is below a relatively low predetermined value. Preferably the selected speed approximates the low idle speed for the engine just after it starts. For example, such speed may be 1200 rpm and it may be desired to give a warning if the oil pressure is less than 20 psi when the engine speed is below 1200 rpm. A second warning is given if the engine speed is above the selected speed and the oil pressure is less than normal, e.g., if the engine speed is above 1200 rpm and the oil pressure is less than 40 psi. To prevent a false signal, a time delay is incorporated so that when the engine initially starts up and increases in speed above the 1200 rpm point sufficient time is given so that the oil pressure can build up to the normal value.

The Oil Step circuit operates in the following manner. As before, each time that the magnet 71 leaves the second Hall switch 74 and the engine is rotating forwardly, a signal is applied to pin 2 of timer 176 to generate a pulse of a duration determined by resistors 177 and 178 and capacitor 179. Resistor 177 is adjusted so that the duration of the timer pulse is equal to the time that it takes for magnet 71 to travel back to Hall switch 73 when the engine is operating at 1200 rpm, The timer output pin 3 is applied to NAND gate 180, together with the signal from Hall switch 73, inverted by inverter 141.

At engine speeds below 1200 rpm, the output of gate 180 will be high at all times so that flip-flop 181 is not set and has a low Q output. This is inverted by inverter 182 so that a high is outputted through diode 183 and resistor 184 to inverter 185. The low output therefrom is applied to the base of transistor 186 to maintain this transistor off. The oil step switch thus grounds its terminal 43 at such time. If the oil pressure is below 20 psi, the conventional pressure-actuated switch 44 (FIG. 1) is open. However, if the oil pressure is below 20 psi, switch 44 will close, completing an energizing circuit to light 46 which will illuminate to provide a warning to the operator of the low oil pressure condition.

An increase in engine speed to 1200 rpm causes the high signal from inverter 141 to be applied to the input of gate 180 during the period of the output pulse from timer 176, and the output of gate 180 will go low to provide a set signal to flip-flop 181. The Q output thereof goes high and is inverted by inverter 182.

It is desirable to provide a time delay between the time that the engine speed reaches 1200 rpm and the time that the oil-step switch 41 is actuated. This time delay is provided herein as follows.

During the time that the speed is below 1200 rpm the high output of inverter 182 will cause capacitor 187 to charge. When the flip-flop 181 is set at 1200 rpm and the output of inverter 182 goes low, capacitor 187 will discharge. Diode 183 prevents discharge into inverter 182 and thus the discharge path for capacitor 187 is through resistor 188. This provides a time delay before the voltage at the input of inverter 185 drops to the transfer level and the output thereof goes high. This delayed high output will turn on transistor 186 to energize the oil step relay coil 189. Typically, a delay of about 8 seconds is desirable and the values of capacitor 187 and resistor 188 are selected to provide such delay.

With relay coil 189 energized, the oil step switch is actuated to ground the normally open contact 47 thereof and complete an energizing circuit through the oil-pressure-actuated switch 48 to light 49. If the oil pressure is above 40 psi, switch 48 is held open. If the pressure falls below that value, switch 48 will close and light 49 will be illuminated to warn the operator of the low oil-pressure condition.

Flip-flop 181 remains set and transistor 186 remains conductive as long as the engine speed remains above 1200 rpm. On the first time that there was a time coincidence of high signals at the input to gate 180, such that its output went low to set the flip-flop 180, the low output of gate 180 was inverted by inverter 191, causing capacitor 192 to charge quickly and apply a high voltage at the reset input R of flip-flop 181. When the time coincidence of high signals to gate 180 ends, its output goes high and the output of inverter 191 goes low. Capacitor 192 cannot discharge into inverter 191 because of diode 193 and must discharge at a relatively slow rate through resistor 194. The next time coincidence of high signals to gate 180 will again cause the output of inverter 191 to go high and recharge capacitor 192. The values of capacitor 194 and resistor 194 are chosen so that capacitor 194 cannot discharge in one cycle of operation to a level sufficient to reset flip-flop 181.

Flip-flop 181 will reset automatically when the engine speed drops below 1200 rpm. At such speed, the output of gate 180 remains high and the output of inverter 191 remains low, allowing capacitor 192 to discharge sufficiently to drop the voltage at the reset input of flip-flop 181 below the transfer level, thus permitting the flip-flop to reset.

With flip-flop 181 reset, transistor 186 turns off to de-energize relay coil 189 so that the oil step switch 41 reverts to its deactuated position.

Although the function of the shutdown circuits (FIGS. 4A and 4B) and sensors (FIGS. 2 and 3) have been described in conjunction with a specific system (FIG. 1) it will be understood that the same relay functions with the same or other trip modes could be used in various modifications of the system of FIG. 1. For example, instead of cutting off the fuel supply, engine shutdown could also be realized by shutting off the air inlet to the engine, or by turning off the ignition system in an engine utilizing spark plugs. The disclosed relays could, if desired, be used to shut down the engine by any one, or a combination, of these methods. If desired, engine shutdown could also be accomplished by use of the oil step relay, if desired. The crank termination relay could be used in conjunction with appropriate circuitry to perform some other function if termination of the start motor operation in manual start operations were to be considered an unnecessary luxury.

The particular arrangement of the speed sensor makes it conveniently suitable for use with logic circuitry of the type shown in FIGS. 4A and 4B to effect control functions related to engine operation at any selected speed point within the range of any type of internal combustion engine. For example, it is well known that for engines equipped with a turbocharger, an increase in the volume of air provided to the turbocharger at low speeds will provide a jet assist to the turbocharger so that turbocharger lag is prevented, thereby allowing faster engine acceleration. The increased air volume fed into the engine from the turbocharger also enhances clean burning and reduces polluting emissions as the engine accelerates. U.S. Pat. No. 3,396,534 discloses a system wherein the volume of air is increased to act as a jet assist in the turbocharger compressor over a preselected turbocharger speed range wherein it is desirable to increase the rate of acceleration of the engine, with the increased air being cut off at the top of the speed range by a control valve responsive to the degree of manifold pressure. Since the present invention provides a system whereby the engine speed can be sensed and control functions effected at preselected speeds, it can easily be used in such a turbocharge system to provide increased air below a selected engine speed.

THE EMBODIMENTS OF THE INVENTION IN WHICH AN EXCLUSIVE PROPERTY OR PRIVI-

LEGE IS CLAIMED ARE DEFINED AS FOLLOWS:

1. Apparatus for controlling the functioning of an engine comprising:

*A.* a shaft driven by said engine at a speed proportional to the engine speed,

*B.* means responsive to rotation of said shaft through a predetermined degree of rotational movement for generating a first signal at the beginning of such movement and a second signal at the end of such movement, p1 *C.* timer means for producing a timer signal of predetermined time duration,

*D.* means for starting said timer in response to generation of said first signal,

*E.* means for effecting a control function in response to time coincidence of said second signal and said timer signal, *said effecting means including,*

*i. a normally reset flip-flop apparatus,*

*ii. means for setting said flip-flop apparatus in response to said second signal being generated during the existence of said timer signal, and*

*iii. means for effecting said control function in response to setting of said flip-flop apparatus.*

[2. Control apparatus as set forth in claim 1 wherein said means for effecting a control function in response to time coincidence of said second signal and said timer signal comprises:

a normally reset flip-flop means, means for setting said flip-flop means if said second signal is generated during the existence of said timer signal, means responsive to the setting of said flip-flop means for effecting said control function.]

3. Apparatus as set forth in claim [2] *1* wherein said timer means includes a capacitor for determining the duration of said timer signal in accordance with the length of time that it takes for said capacitor to charge to a predetermined voltage level and means including a variable resistor connected in series with said capacitor for charging said capacitor through said variable resistor.

4. Apparatus as set forth in claim [2] *1* wherein said timer means includes a first capacitor for determining the duration of said timer signal in accordance with the length of time that it takes for said first capacitor to charge to a predetermined voltage level and means including a variable resistor connected in series with said first capacitor for charging said first capacitor through said variable resistor, said apparatus further including:

a second capacitor, means including a manually operable switch for connecting said first and second capacitors in parallel when said switch is operated.

5. Apparatus as set forth in claim [2] *1* and further including:

a manually operable switch, means responsive to operation of said switch for resetting said flip-flop means.

6. Apparatus as set forth in claim [2] *1* and further including:

means including a capacitor for resetting said flip-flop means when the charge on said capacitor drops below a predetermined value, said means further including means for rapidly charging said capacitor to above said value during the existence of said timer signal and means for slowly discharging said capacitor when said timer signal is not present.

7. Apparatus as set forth in claim [2] *1* wherein said flip-flop means is resettable by application of a low signal thereto and wherein said flip-flop means cannot be set while a low reset signal is applied thereto, and further including:

means including a capacitor for applying a low reset signal to said flip-flop means when the charge on said capacitor is below a predetermined value and a resistor connected across said capacitor for discharge of said capacitor therethrough, means for charging said capacitor during time coincidence of said timer signal and said second signal and at a greater rate than said capacitor can discharge through said resistor.

8. Control apparatus comprising:

*A.* a housing,

*B.* a shaft mounted in said housing for rotation about the axis of said shaft,

*C.* a magnet mounted on said shaft for movement by said shaft through an orbital path relative to said housing,

*D.* magnetically actuated sensor means mounted on said housing adjacent said orbital path for generating a first signal when said magnet has been moved to a fixed point in its orbital path and a second signal when said magnet has been moved a predetermined distance from said fixed point,

*E.* timer means for producing a signal of predetermined time duration,

*F.* means for starting said timer means into operation in response to generation of said first signal,

*G.* means for effecting a control function in response to time coincidence of said second signal and said timer signal *wherein said effecting means includes,*

*i. a flip-flop means,*

*ii. means for setting said flip-flop apparatus in response to said second signal being generated during the existence of said timer signal,*

*iii. means for effecting said control function in response to the setting of said flip-flop apparatus.*

[9. Control apparatus as set forth in claim 8 wherein said means for effecting a control function in response to time coincidence of said second signal and said timer signal comprises:

a flip-flop means, means for setting said flip-flop means if said second signal is generated during the existence of said timer signal, means responsive to the setting of said flip-flop means for effecting said control function.]

10. Apparatus as set forth in claim [9] *7* wherein said timer means includes a capacitor for determining the duration of said timer signal in accordance with the length of time that it takes for said capacitor to charge to a predetermined voltage level and means including a variable resistor connected in series with said capacitor for charging said capacitor through said variable resistor.

11. Apparatus as set forth in claim [9] *7* wherein said timer means includes a first capacitor for determining the duration of said timer signal in accordance with the length of time that it takes for said first capacitor to charge to a predetermined voltage level and means including a variable resistor connected in series with said first capacitor for charging said first capacitor through said variable resistor, said apparatus further including:

a second capacitor, means including a manually operable switch for connecting said first and second capacitors in parallel when said switch is operated.

12. Apparatus as set forth in claim [9] *7* and further including:

a manually operable switch, means responsive to operation of said switch for resetting said flip-flop means.

13. Apparatus as set forth in claim [9] *7* and further including:

means including a capacitor for resetting said flip-flop means when the charge on said capacitor drops below a predetermined value, said means further including means for rapidly charging said capacitor to above said value during the existence of said timer signal and means for slowly discharging said capacitor when said timer signal is not present.

14. Apparatus as set forth in claim [9] *7* and further including:

means for delaying for a predetermined and substantial period of time following time coincidence of said second signal and said timer signal, the operation of said means for effecting said control function.

15. Apparatus as set forth in claim [9] *7* wherein said flip-flop means is resettable by application of a low signal thereto and wherein said flip-flop means cannot be set while a low reset signal is applied thereto, and further including:

means including a capacitor for applying a low reset signal to said flip-flop means when the charge on said capacitor is below a predetermined value and a resistor connected across said capacitor for discharge of said capacitor therethrough, means for charging said capacitor during time coincidence of said timer signal and said second signal and at a greater rate than said capacitor can discharge through said resistor.

16. Apparatus of the character described, comprising:

a housing, a shaft mounted in said housing for rotation about the axis of said shaft, a magnet mounted on said shaft for movement thereby through an orbital path relative to said housing, first and second magnetically actuated sensors mounted on said housing and disposed adjacent said orbital path, said sensors and magnet being dimensioned and said sensors being disposed relative to each other such that as said magnet is moved past said sensors said magnet will first actuate one of said sensors alone, then actuate both sensors simultaneously, then actuate the other of said sensors alone.

17. Apparatus as set forth in claim [16] *14* and further including:

a flip-flop means, means responsive to actuation of said first sensor for setting said flip-flop means when said first sensor is actuated, means responsive to actuation of said second sensor for resetting said flip-flop means when said second sensor is actuated, means for producing an inhibit signal during actuation of either sensor, means for producing a reverse-direction signal each time that said flip-flop means is set and said inhibit signal is not present, means for effecting a control function, means responsive to the production of a reverse-direction signal for actuating said control-function-effecting means.

18. Apparatus as set forth in claim [17] *15* wherein said means responsive to the production of a reverse-direction signal is a latchable means, said apparatus further including:

means for resetting said latchable means when said first flip-flop means is reset by actuation of said second sensor and said inhibit signal is not present.

19. Apparatus as set forth in claim [17] *15* wherein said means responsive to the production of a reverse-direction signal includes means for counting said reverse-direction signals and for inhibiting operation of said control-function-effecting means until the count of said reverse-direction signals is greater than one.

20. Apparatus as set forth in claim [16] *14* and further including:

a first flip-flop means, means responsive to actuation of said first sensor for setting said first flip-flop means when said first sensor is actuated, means responsive to actuation of said second sensor for resetting said first flip-flop means when said second sensor is actuated, means for producing an inhibit signal during actuation of either sensor, means for producing a reverse-directon signal each time that said first flip-flop means is set and said inhibit signal is not present, a second flip-flop means, means responsive to the production of a reverse-direction signal for setting said second flip-flop means, means operable in response to setting of said second flip-flop means for effecting a control function.

21. Apparatus as set forth in claim [20] *18* and further including:

means for resetting said second flip-flop means when said first flip-flop means is reset and said inhibit signal is not present.

22. Apparatus as set forth in claim [20] *18* wherein said means responsive to the production of a reverse-direction signal includes a counting means for counting said reverse-direction signals and for inhibiting setting of said second flip-flop means until the count of said reverse-direction signals is greater than one.

23. Apparatus as set forth in claim [21] *19* and further including:

means for resetting said second flip-flop means and said counting means when said first flip-flop means is reset and said inhibit signal is not present.

24. Apparatus as set forth in claim [16] *14* and further including:

timer means for producing a signal of predetermined time duration, means responsive to each movement of said magnet past said sensors for causing said timer means to produce its signal after said first sensor is deactuated, a flip-flop means, means responsive to the presence of said timer signal and actuation of said first sensor for setting said flip-flop means if said first sensor is actuated by said magnet during the existence of said timer signal, means responsive to the setting of said flip-flop means for effecting a control function.

25. Apparatus as set forth in claim [24] *22* wherein said timer means includes a capacitor for determining the duration of said timer signal in accordance with the length of time that it takes for said capacitor to charge to a predetermined voltage level and means including a variable resistor connected in series with said capacitor for charging said capacitor through said variable resistor.

26. Apparatus as set forth in claim [24] *22* wherein said timer means includes a first capacitor for determining the duration of said timer signal in accordance with the length of time that it takes for said first capacitor to charge to a predetermined voltage level and means including a variable resistor connected in series with said first capacitor for charging said first capacitor through said variable resistor, said apparatus further including:

a second capacitor, means including a manually operable switch for connecting said first and second capacitor in parallel when said switch is operated.

27. Apparatus as set forth in claim [24] *22* and further including:

a manually operable switch, means responsive to operation of said switch for resetting said flip-flop means.

28. Apparatus as set forth in claim [24] *22* and further including:

means including a capacitor for resetting said flip-flop means when the charge on said capacitor drops below a predetermined value, said means further including means for rapidly charging said capacitor to above said value during the existence of said timer signal and means for slowly discharging said capacitor when said timer signal is not present.

29. Apparatus as set forth in claim [24] *22* and further including:

means for delaying the operation of said control-function-effecting means for a predetermined and substantial period of time following time coincidence of said second signal and said timer signal.

30. Apparatus as set forth in claim [24] *22* wherein said flip-flop means is resettable by application of a low signal thereto and wherein said flip-flop means cannot be set while a low reset signal is applied thereto, and further including:

means including a capacitor for applying a low reset signal to said flip-flop means when the charge on said capacitor is below a predetermined value and a resistor connected across said capacitor for discharge of said capacitor therethrough, means for charging said capacitor during time coincidence of said timer signal and first season actuation at a greater rate than said capacitor can discharge through said resistor.

31. Apparatus as set forth in claim [16] *14* and further including:

a first flip-flop means, means responsive to actuation of said first sensor for setting said first flip-flop means when said first sensor is actuated, means responsive to actuation of said second sensor for resetting said first flip-flop means when said second sensor is actuated, means for producing an inhibit signal during actuation of either sensor, means for producing a reverse-direction signal each time that said first flip-flop means is set and said inhibit signal is not present, means responsive to the production of a reverse-direction signal for effecting a control function, timer means for producing a signal of predetermined time duration, means for starting said timer means into operation each time said first flip-flop means is reset and said inhibit signal is not present, a second flip-flop means, means for setting said second flip-flop means if said first sensor is actuated by said magnet during the existence of said timer signal, means responsive to the setting of said second flip-flop means for effecting a control function.

32. Apparatus as set forth in claim [31] *29* wherein said timer means includes a capacitor for determining the duration of said timer signal in accordance with the length of time that it takes for said capacitor to charge to a predetermined voltage level and means including a variable resistor connected in series with said capacitor for charging said capacitor through said variable resistor.

33. Apparatus as set forth in claim [31] *29* wherein said timer means includes a first capacitor for determining the duration of said timer signal in accordance with the length of time that it takes for said first capacitor to charge to a predetermined voltage level and means including a variable resistor connected in series with said first capacitor for charging said first capacitor through said variable resistor, said apparatus further including:

a second capacitor, means including a manually operable switch for connecting said first and second capacitors in parallel when said switch is operated.

34. An automatic impedance-changing circuit for connecting a load to a direct current voltage source, said circuit having an input connected to one side of said voltage source and an output connected to said load, said load being also connected to the other side of said voltage source for current flow from a voltage source through said circuit and said load, said current comprising:

a first current path from the input of said circuit to the output thereof, said first current path having a resistor therein, a second current path from the input of said circuit to the output thereof, said second current path having a switch means therein for allowing current flow through said second current path when said switch means is closed and for preventing current flow through said second current path when said switch means is open, means connected between the input of said circuit and said other side of said voltage source for closing said switch means if the voltage at said input is below a predetermined magnitude.

35. A circuit as set forth in claim [34] *32* wherein said second current path shorts across said resistor in said first current path when said switch means is closed.

36. A circuit as set forth in claim [34] *32* wherein said second current path includes a resistor which is connected in parallel with the first current path resistor when said switch means is closed.

37. A circuit as set forth in claim [36] *34* and further including:

a third current path from the input of said circuit to the output thereof, said third current path having a switch means therein for allowing current flow through said third current path when said switch means is closed and for preventing current flow through said third current path when said switch means is open, means connected between the input of said circuit and said other side of said voltage source for closing said third current path switch means if the voltage at said input is below a predetermined magnitude which is less than the predetermined magnitude for closing said second current path switch means.

38. A circuit as set forth in claim [37] *35* wherein said third current path shorts across said resistor in said first current path when said third current path switch means is closed.

39. An automatic impedance-changing circuit for connecting a load to a direct current voltage source, said circuit having an input connected to one side of said voltage source and an output connected to said load, said load also being connected to the other side of said voltage source for current flow from a voltage source through said circuit and said load, said circuit comprising:

a first current path from the input of said circuit to the output thereof, said first current path having a resistor therein, a second current path from the input of said circuit to the output thereof, said second current path having a transistor therein to allow or prevent current flow through said second current path if said transistor is on or off, respectively, means including a zener diode connected between the input of said circuit and said other side of said battery, said zener diode being conductive if the voltage at said input exceeds the breakdown potential of said zener diode, means responsive to conduction of said zener diode for turning said transistor off and responsive to non-conduction of said zener diode for turning said transistor on.

40. A circuit as set forth in claim [39] *37* wherein said second current path shorts across said first current path resistor when said transistor is turned on.

41. A circuit as set forth in claim [39] *37* wherein said second current path includes a resistor in series with said transistor.

42. A circuit as set forth in claim [39] *37* and further including:

a third current path from the input of said circuit to the output thereof, said third current path having a transistor therein to allow or prevent current flow through said third current path if said transistor is on or off, respectively, means including a second zener diode connected between the input of said cirucit and said other side of said battery, said second zener diode being conductive if the voltage at said input exceeds the breakdown potential of said second zener diode, said second zener diode having a breakdown potential lower than that of said first-mentioned zener diode, means responsive to conduction of said second zener diode for turning said third current path transistor off and responsive to non-conduction of said zener diode for turning said transistor on.

43. A circuit as set forth in claim [42] *40* wherein said third current path shorts across said first current path resistor when said third current path transistor is turned on.

* * * * *

UNITED STATES PATENT AND TRADEMARK OFFICE

CERTIFICATE OF CORRECTION

PATENT NO. : Re. 30,928

DATED : May 11, 1982

INVENTOR(S) : Joe E. Fuzzell et al.

It is certified that error appears in the above—identified patent and that said Letters Patent is hereby corrected as shown below:

Under column 3, line 47, "by" should be --be--.

Under column 4, line 56, "92" should be --93--.

Under column 6, line 23, "appliee" should be --applies--.

Column 9, line 14, "timer" should be --time--.

Column 11, line 25, "below" should be --above--.

Signed and Sealed this

*Thirty-first* Day of *August 1982*

[SEAL]

*Attest:*

GERALD J. MOSSINGHOFF

*Attesting Officer*

*Commissioner of Patents and Trademarks*

UNITED STATES PATENT AND TRADEMARK OFFICE

CERTIFICATE OF CORRECTION

PATENT NO. : Re. 30,928

DATED : May 11, 1982

INVENTOR(S) : Joe E. Fuzzell et al.

It is certified that error appears in the above-identified patent and that said Letters Patent are hereby corrected as shown below:

In the claims:

Claim 10, line 1, delete "7" and substitute therefore --8--;

Claim 11, line 1, delete "7" and substitute therefore --8--;

Claim 12, line 1, delete "7" and substitute therefore --8--;

Claim 13, line 1, delete "7" and substitute therefore --8--;

Claim 14, line 1, delete "7" and substitute therefore --8--;

Claim 15, line 1, delete "7" and substitute therefore --8--;

Claim 17, line 1, delete "14" and substitute therefore --16--;

Claim 18, line 1, delete "15" and substitute therefore --17--;

Claim 19, line 1, delete "15" and substitute therefore --17--;

Claim 20, line 1, delete "14" and substitute therefore --16--;

Claim 21, line 1, delete "18" and substitute therefore --20-;

Claim 22, line 1, delete "18" and substitute therefore --20-;

Claim 23, line 1, delete "19" and substitute therefore --21--;

Claim 24, line 1, delete "14" and substitute therefore --16--;

Claim 25, line 1, delete "22" and substitute therefore --24--;

Claim 26, line 1, delete "22" and substitute therefore --24--;

Claim 27, line 1, delete "22" and substitute therefore --24--;

UNITED STATES PATENT AND TRADEMARK OFFICE

CERTIFICATE OF CORRECTION

PATENT NO. : Re. 30,928

DATED : May 11, 1982

INVENTOR(S) : Joe E. Fuzzell et al.

It is certified that error appears in the above-identified patent and that said Letters Patent are hereby corrected as shown below:

In the claims continued:

Claim 28, line 1, delete "22" and substitute therefore --24--;

Claim 29, line 1, delete "22" and substitute therefore --24--;

Claim 30, line 1, delete "22" and substitute therefore --24--;

Claim 31, line 1, delete "14" and substitute therefore --16--;

Claim 32, line 1, delete "29" and substitute therefore --31--;

Claim 33, line 1, delete "29" and substitute therefore --31--;

Claim 35, line 1, delete "32" and substitute therefore --34--;

Claim 36, line 1, delete "32" and substitute therefore --34--;

Claim 37, line 1, delete "34" and substitute therefore --36--;

Claim 38, line 1, delete "35" and substitute therefore --37--;

Claim 40, line 1, delete "37" and substitute therefore --39--;

Claim 41, line 1, delete "37" and substitute therefore --39--;

UNITED STATES PATENT AND TRADEMARK OFFICE

CERTIFICATE OF CORRECTION

PATENT NO. : Re. 30,928

DATED : May 11, 1982

INVENTOR(S) : Joe E. Fuzzell et al.

It is certified that error appears in the above-identified patent and that said Letters Patent is hereby corrected as shown below:

Claim 42, line 1, delete "37" and substitute therefore --39--; and

Claim 43, line 1, delete "40" and substitute therefore --42--.

Signed and Sealed this

Thirtieth Day of December, 1986

*Attest:*

DONALD J. QUIGG

*Attesting Officer*

*Commissioner of Patents and Trademarks*